(12) United States Patent
Engel

(10) Patent No.: US 8,051,109 B2
(45) Date of Patent: Nov. 1, 2011

(54) CLASSIFICATION-EXPANDED INDEXING AND RETRIEVAL OF CLASSIFIED DOCUMENTS

(75) Inventor: Alan Kent Engel, Ibaraki (JP)

(73) Assignee: Paterra, Inc., Kerrville, TX (US)

( * ) Notice: Subject to any disclaimer, the term of this patent is extended or adjusted under 35 U.S.C. 154(b) by 134 days.

(21) Appl. No.: 12/497,812

(22) Filed: Jul. 6, 2009

(65) Prior Publication Data

US 2010/0017400 A1    Jan. 21, 2010

Related U.S. Application Data

(63) Continuation of application No. 10/960,725, filed on Oct. 8, 2004, now Pat. No. 7,574,433.

(51) Int. Cl.
*G06F 17/30* (2006.01)

(52) U.S. Cl. .................................. 707/809; 715/239

(58) Field of Classification Search .................. 707/809, 707/803, 811; 715/239
See application file for complete search history.

(56) References Cited

U.S. PATENT DOCUMENTS

| | | | |
|---|---|---|---|
| 5,765,176 A | 6/1998 | Bloomberg | |
| 5,835,087 A | 11/1998 | Herz et al. | |
| 6,038,560 A | 3/2000 | Wical | |
| RE36,653 E | 4/2000 | Heckel et al. | |
| 6,105,022 A | 8/2000 | Takahashi et al. | |
| 6,598,046 B1 | 7/2003 | Goldberg et al. | |
| 6,625,596 B1 | 9/2003 | Nunez | |
| 6,711,585 B1 | 3/2004 | Copperman et al. | |
| 6,778,979 B2 | 8/2004 | Grefenstette et al. | |
| 6,820,075 B2 | 11/2004 | Shanahan et al. | |
| 6,928,425 B2 | 8/2005 | Grefenstette et al. | |
| 7,031,961 B2 | 4/2006 | Pitkow et al. | |
| 7,177,904 B1 | 2/2007 | Mathur et al. | |
| 2001/0044797 A1* | 11/2001 | Anwar | 707/803 |
| 2002/0147738 A1 | 10/2002 | Reader | |
| 2003/0120653 A1* | 6/2003 | Brady et al. | 707/752 |
| 2003/0154186 A1* | 8/2003 | Goodwin et al. | 707/705 |
| 2003/0229626 A1 | 12/2003 | Nayak | |
| 2004/0177015 A1 | 9/2004 | Galai et al. | |

FOREIGN PATENT DOCUMENTS

JP    2003-345950 A    12/2003

OTHER PUBLICATIONS

Notice of Allowance dated Apr. 6, 2009—U.S. Appl. No. 10/960,725, filed Oct. 8, 2004.

* cited by examiner

*Primary Examiner* — Shahid Alam
(74) *Attorney, Agent, or Firm* — Saul Ewing LLP; Gianna Julian-Arnold

(57) ABSTRACT

Document classification systems are valuable tools for searching and retrieving classified documents but can be prohibitively complex and cumbersome for users.
A system for the indexing and retrieval of classified documents inserts keywords, titles or definitions of previously applied classifications into the document record and provides the resulting record to a search engine. Searchers are able to retrieve documents by searching on keywords from the classification system without looking up class coding.

9 Claims, 12 Drawing Sheets

Typical Document Server Web Site

```
United States Patent Application 20040177088
Kind Code A1
Jeffrey, Joel    September 9, 2004
------------------------------------------------------------------------
Wide-spectrum information search engine Abstract
A method and computer program product for comparing documents includes segmenting
a judgment matrix into a plurality of information sub-matrices where each submatrix
has a plurality of classifications and a plurality of terms relevant to each
classification; evaluating a relevance of each term of the plurality of terms with
respect to each classification of each information submatrix of the information
submatrices; calculating an information spectrum for a first document based upon at
least some of the plurality of terms; calculating an information spectrum for a
second document based upon at least some of the plurality of terms; and identifying
the second document as relevant to the first document based upon a comparison of
the calculated information spectrums.
------------------------------------------------------------------------
Inventors: Jeffrey, Joel ; (Wheaton, IL)
Correspondence Name and Address: FISH & RICHARDSON P.C.
    3300 DAIN RAUSCHER PLAZA
    MINNEAPOLIS
    MN
    55402
    US
Assignee Name and Address: H5 Technologies, Inc., a California corporation Serial No.: 800217
Series Code: 10
Filed: March 12, 2004

U.S. Current Class: 707/102
U.S. Class at Publication: 707/102
Intern'l Class: G06F 017/30
```

FIG. 4

United States Patent Application 20040177088
Kind Code A1
Jeffrey, Joel  September 9, 2004

---

Wide-spectrum information search engine

Abstract
A method and computer program product for comparing documents includes segmenting a judgment matrix into a plurality of information sub-matrices where each submatrix has a plurality of classifications and a plurality of terms relevant to each classification; evaluating a relevance of each term of the plurality of terms with respect to each classification of each information submatrix of the information submatrices; calculating an information spectrum for a first document based upon at least some of the plurality of terms; calculating an information spectrum for a second document based upon at least some of the plurality of terms; and identifying the second document as relevant to the first document based upon a comparison of the calculated information spectrums.

---

Inventors: Jeffrey, Joel ; (Wheaton, IL)
Correspondence Name and Address: FISH & RICHARDSON P.C
    3300 DAIN RAUSCHER PLAZA
    MINNEAPOLIS
    MN
    55402
    US
Assignee Name and Address: H5 Technologies, Inc., a California corporation Serial No.: 800217
Series Code: 10
Filed: March 12, 2004

U.S. Current Class: 707/102

- Class 707  DATA PROCESSING: DATABASE AND FILE MANAGEMENT OR DATA STRUCTURES

- 100  DATABASE SCHEMA OR DATA STRUCTURE

- 102  Generating database or data structure (e.g., via user interface)
U.S. Class at Publication: 707/102
Intern'l Class: G06F 017/30

FIG. 5

United States Patent Application 20040177088
Kind Code A1
Jeffrey, Joel   September 9, 2004
------------------------------------------------------------

Wide-spectrum information search engine

Abstract
A method and computer program product for comparing documents includes segmenting a judgment matrix into a plurality of information sub-matrices where each submatrix has a plurality of classifications and a plurality of terms relevant to each classification; evaluating a relevance of each term of the plurality of terms with respect to each classification of each information submatrix of the information submatrices; calculating an information spectrum for a first document based upon at least some of the plurality of terms; calculating an information spectrum for a second document based upon at least some of the plurality of terms; and identifying the second document as relevant to the first document based upon a comparison of the calculated information spectrums.
------------------------------------------------------------

Inventors: Jeffrey, Joel ; (Wheaton, IL)
Correspondence Name and Address:     FISH & RICHARDSON P.C.
    3300 DAIN RAUSCHER PLAZA
    MINNEAPOLIS
    MN
    55402
    US
 Assignee Name and Adress: H5 Technologies, Inc., a California corporation Serial No.:  800217
Series Code:  10
Filed:  March 12, 2004

U.S. Current Class: 707/102
 - クラス 707 情報処理：データーベースとファイル管理またはデーター構造体
 - 100 データーベース・スキーマまたはデータ―構造体
 - 102 データーベースまたはデーター構造体の作成（例えば、ユーザー・インターフェースにより）
U.S. Class at Publication: 707/102
Intern'l Class:   G06F 017/30

FIG. 6

| CODE | TITLE |
|---|---|
| C0C2S000000 | APPAREL |
| C002S001000 | MISCELLANEOUS |
| C002S455000 | GUARD OR PROTECTOR |
| C002S456000 | Body cover |

FIG. 7

| classid | level | code | cdisp | title |
|---|---|---|---|---|
| 1 | 0 | C002S000000 | Class 2 | APPAREL |
| 2 | 1 | C002S001000 | 1 | MISCELLANEOUS |
| 3 | 1 | C002S455000 | 455 | GUARD OR PROTECTOR |
| 4 | 2 | C002S456000 | 456 | Body cover |
| 5 | 3 | C002S457000 | 457 | Hazardous material body cover |

FIG. 8a

| classid | ancestroid |
|---|---|
| 2 | 1 |
| 3 | 1 |
| 4 | 1 |
| 4 | 3 |
| 5 | 1 |
| 5 | 3 |
| 5 | 4 |

FIG. 8b

CLASSIFICATION-EXPANDED INDEXING AND RETRIEVAL OF CLASSIFIED DOCUMENTS

PRIORITY INFORMATION

This application is a continuation application of prior application Ser. No. 10/960,725, filed on Oct. 8, 2004, now U.S. Pat. No. 7,574,433 the content of which is incorporated in its entirety.

TECHNICAL FIELD

This invention relates to the indexing and retrieval of documents to which classification codes and schemes have been applied and, in particular, relates to the indexing and retrieval of patent documents.

BACKGROUND

It is standard practice for intellectual property authorities to classify applications and documents by one or more classification and/or indexing schemes. For example, the United States Patent and Trademark Office (USPTO) applies the U.S. Patent Classification (USPC) system and the International Patent Classification (IPC) system to patent applications filed in its offices. Likewise, the European Patent Office applies the European Classification system (ECLA) and IPC to applications filed in its offices and the Japan Patent Office (JPO) applies the File Index system (FI) and F-Terms systems to applications filed at its office.

More broadly, information vendors and database providers frequently develop and apply various coding schemes to documents that they index and provide on their services. For example, BIOBASE, a database produced by Reed Elsevier uses a proprietary classification coding system. ESBIOBASE [ONLINE], [retrieved on 2004-03-17]. Retrieved from: <http://www.cas.org/ONLINE/DBSS/esbiobasess.html>.

These classification and indexing systems are indispensible for the rapid retrieval and handling of information. They are essential tools in the efficient and effective examination of patent applications. Their application incorporates a high degree of intellectual input.

Unfortunately, most classification and indexing systems are very sophisticated and complex. Effective use requires a high level of training. For example, European Patent Office examiners receive two years of training on ECLA before they are allowed to conduct unsupervised prior art searches using the ECLA system. The U.S. Patent Classifications and the Japanese F-Term systems are similarly sophisticated.

Moreover, even within the field of patent information, skilled searching of the Trilateral Patent Offices requires that the search learn and search each of the national or regional classification systems separately. In other words, the searcher needs to learn ECLA to search EPO documents, the U.S. classifications to search U.S. patent documents, and the FI and F-term systems in order to search JPO documents. Even the tools and resources needed to do this are lacking. For example, there is no known English index of the JPO F-term system. In a recent symposium (FUJI, Yoshihiro "Providing Japanese patent information to non-Japanese users" Far East Meets West in Vienna: EPIDOS Users' Meeting on Japanese Patent Information, 2003-10-23, Vienna, Austria (Post-presentation discussion)), a JPO patent examiner recommended the following procedure for determining the appropriate FI class for searching a particular concept: First, on the EPO website (http://v3.espacenet.com/eclasrch?CY=ep&LG=en) to determine an appropriate ECLA class. Second, assume rough equivalence between ECLA and FI and search the corresponding FI class on the JPO website (http://www4.ipdl.jpo.go.jp/Tokujitu/tjftermenb.ipdl). This is very cumbersome and subject to error.

As a result the advantages of classification and indexing systems are beyond the grasp of more casual users and information professionals.

On the other hand, the rapid recent growth of fulltext-base patent retrieval services on the Internet has led lay persons and information professionals alike to rely increasingly on keyword searching. While keyword searching has its advantages and is easy to use, variations in terminology can easily lead to missed documents. Moreover, the intellectual product embodied in the classifications applied to the documents is totally lost.

In related art, D & B Duns Market Identfiers database on DIALOG (http://library.dialog.com/bluesheets/html/bl0516.html) provides for searching SIC descriptors as a search field. TRADEMARKSCAN provides for searching international class descriptors as a search field (http://library.dialog.com/bluesheets/html/bl0669.html).

DISCLOSURE OF INVENTION PROBLEM

Invention Seeks to Solve

Figure 1:
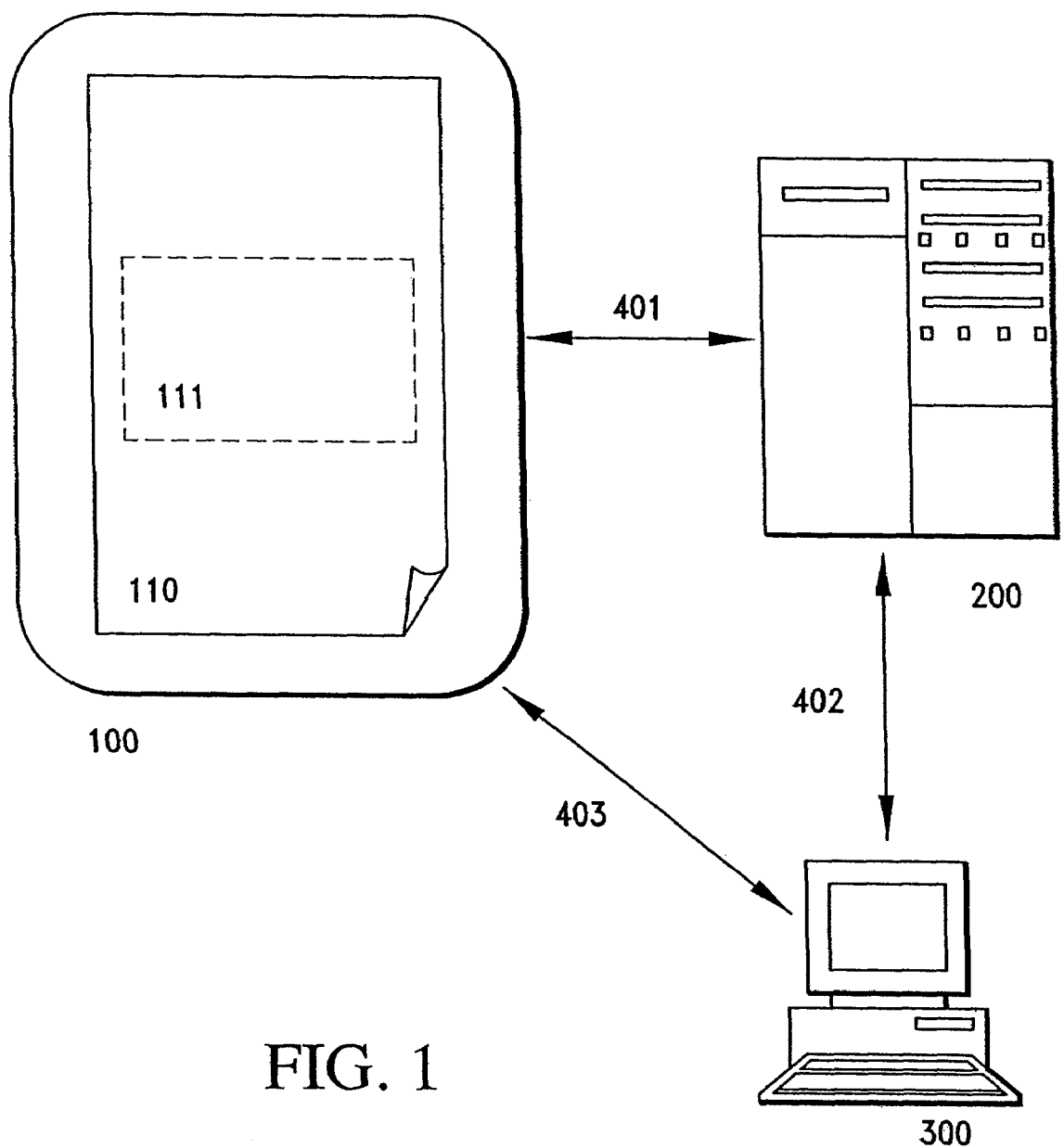
FIG. 1 Conceptual depiction of document server—search engine—client environment

This invention seeks to make the advantages of classification searching available to information users without compelling them to learn the details, and particularly, the coding schemes and formats, of the various classification systems.

BRIEF SUMMARY OF THE INVENTION

This invention provides for retrieval and indexing by search engines of classified documents in which a portion of the classification coding has been supplemented with inserted terms, keywords, titles or definitions derived from the classification system's schedule and definitions.

One aspect of this invention is a system for the indexing and retrieval of classified documents, the system comprising, at least one server computer which is connected to a document store, said document store containing at least one static document derived from a document collection to which at least one classification system code has been previously applied, said document containing at least one keyword derived from the title or definition of said code, and a connection between the server computer and at least one search engine system. Further, the static document can be in HTML or XML format. Further, the terms derived from the classification system can be in a language other than the language of the document in the document store. Further, the document in the document store can be a patent document. Futher, there can be a connection between the server computer and a client computer.

Another aspect of this invention is a system for the indexing and retrieval of classified documents, the system comprising, at least one server computer which is connected to a document store, said document store containing at least one static document derived from a document collection to which at least one classification system code has been previously applied, said static document containing at least one retrieval key corresponding to the title and/or definition of said code; a database system comprising at least one term derived from the title and/or definition of said classification system code; a connection between the server computer and at least one search engine system; and a means for dynamically inserting said term into the static document in response to a request from the search engine system and communicating the resulting document to the search engine system. Further, the static document can be in HTML, XML, PDF or MSWord format. Further, the terms derived from the classification system can be in a language other than the language of the document in the document store. Further, the document in the document store can be a patent document. Futher, there can be a connection between the server computer and a client computer.

Another aspect of this invention is a computerized method for the indexing and retrieval of classified documents comprising the method steps of, in response to a request from a search engine system, retrieving a document from a document store, said document store containing at least one static document derived from a document collection to which at least one classification system code has been previously applied, said document containing at least one term derived from the title or definition of said code; and transmitting said document to the search engine system. Further, the static document can be in HTML, XML, PDF or MSWord format. Further, the terms derived from the classification system can be in a language other than the language of the document in the document store. Further, the document in the document store can be a patent document. Futher, there can be a connection between the server computer and a client computer.

Another aspect of this invention is a computerized method for the indexing and retrieval of classified documents comprising the method steps of, in response to a request from a search engine system, retrieving a document from a document store, said document store containing at least one static document derived from a document collection to which at least one classification system code has been previously applied, said document containing at least one retrieval code corresponding to the title and/or definition of said code; retrieving from a database at least one term derived from the title and/or definition of said classification system code; dynamically inserting said term into the static document; and transmitting the resulting document to the search engine system. Further, the static document can be in HTML or XML format. Further, the terms derived from the classification system can be in a language other than the language of the document in the document store. Further, the document in the document store can be a patent document. Futher, there can be a connection between the server computer and a client computer.

Another aspect of this invention is a computerized method for the retrieval of classified documents comprising the method steps of, causing a client software application in a client computer to initiate a connection to a server computer; and causing the client software application in a client computer to make at least one request to the server computer, said request causing the server computer to carry out a method comprising the following method steps: retrieving a document from a document store, said document store containing at least one static document derived from a document collection to which at least one classification system code has been previously applied, said document containing at least one retrieval code corresponding to the title and/or definition of said code; retrieving from a database at least one term derived from the title and/or definition of said classification system code; dynamically inserting said term into the static document; and transmitting the resulting document to a client computer. Further, the static document can be in HTML, XML, PDF or MSWord format. Further, the terms derived from the classification system can be in a language other than the language of the document in the document store. Further, the document in the document store can be a patent document. Futher, there can be a connection between the server computer and a client computer.

DEFINITIONS

Search Engine

A server or a collection of servers dedicated to indexing internet web pages, storing the results and returning lists of pages which match particular queries. The indexes are normally generated—using spiders but may also be based on OEM content provided from a search engine that has a spider that actively crawls the web. Some of the major search engines are AltaVista, Excite, Hotbot, Infoseek, Lycos, Northern Light and Webcrawler.

"Web Spider" or 'Web Robot'

Program that searches the World Wide Web in order to identify new (or changed) pages for the purpose of adding those pages to a search service's ("search engine's") database.

Web Grabber

Program that automatically downloads web site content for the purpose of subsequent offline viewing or processing.

Web Site

A user-accessible server site that implements the basic World Wide Web standards for the coding and transmission of hypertextual documents. These standards currently include, without limitation, HTML (the Hypertext Markup Language) and HTTP (the Hypertext Transfer Protocol). In addition, reference is made to Java script (also referred to as JavaScript), though other types of script, programming languages, and code can be used as well. It should be understood that the term "site" is not intended to imply a single geographic location, as a Web or other network site can, for example, comprise multiple geographically distributed computer systems that are appropriately linked together. Furthermore, while the following description relates to an embodiment utilizing the Internet and related protocols, other networks, such as networked interactive televisions, and other protocols may be used as well.

Document Server—Search Engine—Client Environment

FIG. 1 depicts the generalized operating environment of the current invention. This environment comprises document server web site 100, search engine 200 and client 300. These are interconnected via network connections 401, 402 and 403. This operating environment can reside within a single organization's intranet or can extend across the global Internet with web site 100, search engine 200 and client 300 physically located on separate continents.

Document Server Web Site

Figure 2:
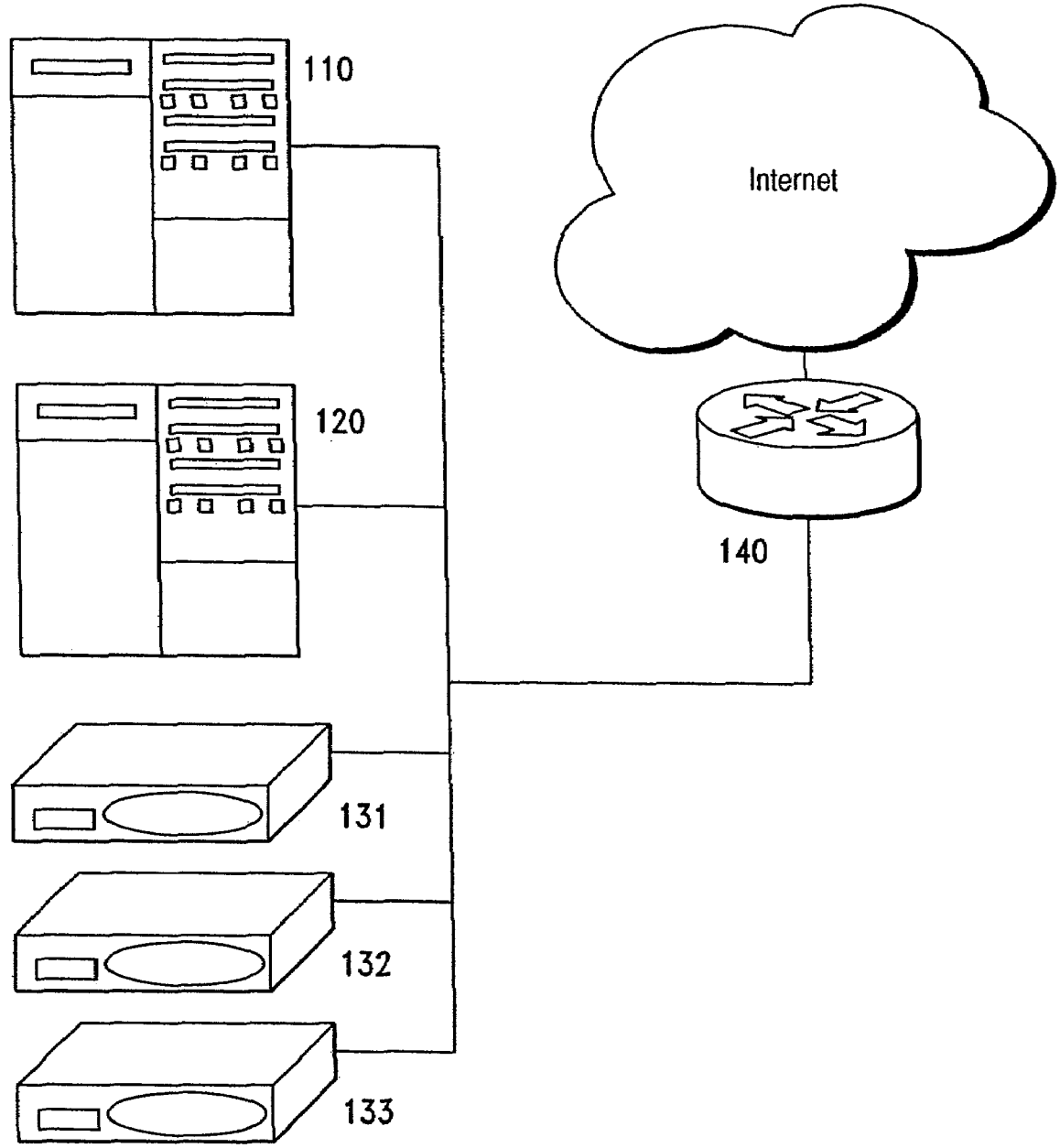
FIG. 2 Typical hardware and software configuration for document server website according to this invention FIG. 3 Public search engines in the United Kingdom FIG. 4 Conventional classified document FIG. 5 Classified document according to this invention FIG. 6 Classified document according to this invention with inserted classification information in a second language FIG. 7 Table of classification information according to this invention FIG. 8 Table of classification information according to the Preferred Embodiment FIG. 9 Process for producing document store according to Embodiment 4

FIG. 2 depicts a typical hardware and software configuration for document server website 100 according to this invention. Web server 110 provides the physical housing for a web server application. Database server 120 provides the physical housing for a database containing classification system data. Network attached storage (NAS) servers 131, 132 and 133 provide a data store for documents to be served over the network by web server 110. Router 140 provides the connection to the Internet. Persons knowledgeable in the field will recognize that there can be many variations on this configuration without departing from this invention. For example, there can be a plurality of web servers 110 to provide load balancing or to server a plurality of document collections. Also, there can be a plurality of database servers 120 to provide load balancing, failover and a plurality of classification systems. The number of NAS servers can vary widely to provide a scalable data store. Finally, all of the functions provided by the hardware depicted in FIG. 2 can be combined on a single server. At the other extreme, document server web site 100 can be a logical one with its physical components destributed distantly and connected via the Internet or other communications network. The content of the document server web site according to this invention is described in more detail below.

Search Engine

Public Search Engines

Figure 3:
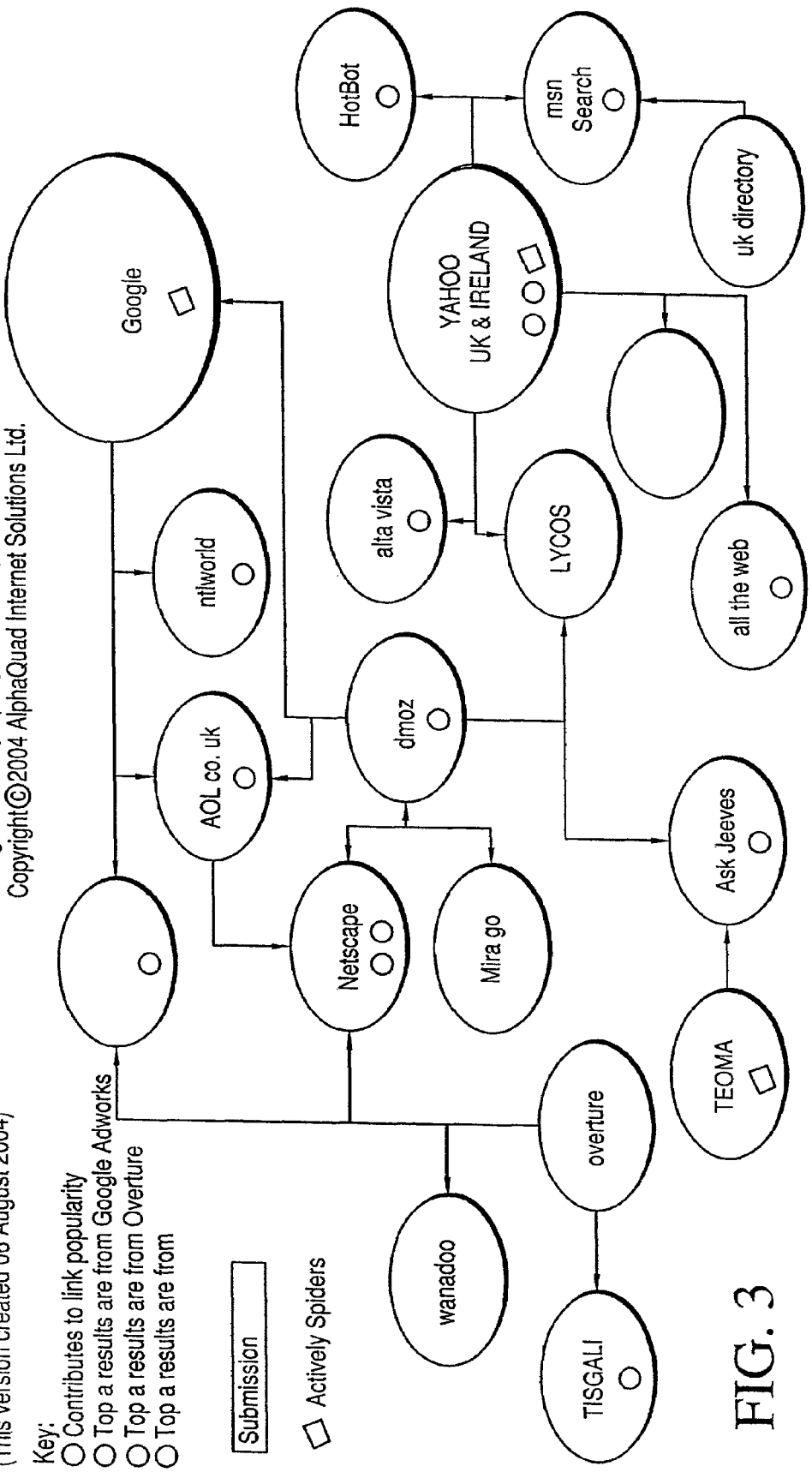

Public search engines that can be used with this invention include, without limitation, the following: Google, Yahoo, Ask Jeeves, AllTheWeb.com, AOL Search,HotBot, Teoma, AltaVista, Gigablast, LookSmart, Lycos, MSN Search, Excite, Inktomi, WebWombat, WebCrawler, Overture, and WiseNut. A contemporary diagram of major search engines in the United Kingdom and their relationships is shown in FIG. 3 (from http://www.alphaquad.co.uk/internet_marketing_notes/uk-search_engine_relationships.jpg).

Private Search Engines

This invention can be implemented with a private search engine that is controlled in association with the document server. A common implementation is a server computer on which a search engine software application has been installed.

Examples of server computers that can be used in this role include, without limitation, the following: Windows-installed computers such as Dell brand PowerEdge servers, HP Proliant servers, Sun Fire V20z and IBM e325 servers; LINUX-installed computers such as Dell brand PowerEdge servers; MacOS-installed servers such as Apple Xserve; and UNIX-installed servers such as Sun Netra servers.

Examples of search engine software applications that can be used in this role include, without limitation, the following:

ES.NET 2004 by Innerprise runs on Windows 2000/XP/2003 servers and is a full-text indexing Web crawler and search engine. With ES.NET, documents are crawled and indexed from an Intranet, Web Site, or the Web. Crawling and updating can be automated using the built-in scheduler. ES.NET 2004 consists of a Windows Service (actual spider), a Web Application (interface to the service), and a Search Application (for integration into an existing Web site). ES.NET 2004 supports common file types through the use of (Filters, including, without limitation, HTML, XML, Microsoft Word (.DOC), Microsoft Excel (.XLS), Adobe Acrobat (.PDF), MP3 ID3v1 & ID3v2 (.MP3), and Rich Text Format (.RTF).

Active Search Engine by Myrasoft is a server application that allows developers to create a Yahoo style search engine. It features an interactive user interface and administration tools for link management and approval, category creation, keyword based search, automatic confirmation of new links, user email list management, among other features.

Search Engine Studio by Xtreeme automatically indexes a target Web site using four methods, and then creates a search engine for the Web site or an offline search for CD-ROM and DVD distribution.

Other site search engine software applications include, without limitation, Namo DeepSearch by SJ Namo Interactive, Inc., Atrise Everyfind by Atrise Software, ActiveSearch SiteSearch SDK, Albert web, Alkaline (Vestris), Amberfish, ARTS PDF Search, ASPSeek, ASTAWare SearchKey, Atomica, Atomz Search, Autonomy Search Server, BeSeen from Looksmart (aka whatUSeek intraSearch), BooleanSearch, BBDBot, BRS/Search, CGISRCH, Compass (now iPlanet Search), Convera RetrievalWare, Copernic, crawl-it, Cybotics, DarWin Set, Datagold, Datapark Search, DeepSearch, Dieselpoint Search, DioWeb, DMP Scout, DocFather, Doclinx TeraXML, DolphinSearch, dtSearch Web, EasyAsk, ebhath, Educesoft ASP Search Engine, 80-20 Discovery, Elise Matching Engine, Endeca Commerce, Catalog and Enterprise Search, Engenium Semetric, Enterprise Search (Innerprise), Eureka, eVe Image Search, Everyfind, Excalibur RetrievalWare, Extense, Extropia Site Search, F3DSearch, FAST Search Server, Findex (now Onix), Fluid Dynamics Search, FreeFind, Fulcrum Search Server (now Hummingbird), FusionBot, Glimpse, Harvest, HomepageSearchEngine, ht://Dig, Hummingbird Search Server, i411 Faceted Metadata Search, IBM Intelligent Miner for Text, ICE, ic-find, IDKSM, IMP Database Search Engine, Index Search (Xavatoria), Index Server (Microsoft), IndexMySite, Inktomi Search Software, InMagic, InQuirafor Search, Intelligent Miner for Text, Intelliseek Enterprise Search, InteracTiveTools Search Engine, interMedia, Intermediate Search (Fluid Dynamics), IntuiFind (Mercado), Inxight SmartDiscovery, i-phrase, iPlanet Search (formerly Netscape Compass), I-Search, (search, Isys:web, IXE: Ideare indexing Engine, JObjects QuestAgent, Juggernautsearch, JXTA Search, KSearch, K2 (Verity), LexiQuest LexiGuide, linkSearch, Lotus Extended Search (Domino), Lucene, Lycos InSite Pro Service, Master.com (Webinator Remote), Matt's SimpleSearch, Mercado IntuiFind, MetaStar, Microsearch WebSearch, Microsoft Index Server, Microsoft SharePoint, Microsoft Site Server, MiniSearch, mnoGoSearch (formerly UdmSearch), MondoSearch, MPS Information Server, Muscat, Namazu, Nathra, Nav4, NetMind Search-It, Netrics Search (previously Likelt), Netscape Compass (now iPlanet Search), Net.Sprint, NextPage (LivePublish), Northern Light (search service & EIP), Noviforum (was Trident), NQL, Nutch, Onix, OmSearch, OpenBridge (formerly ZNOW), OpenFTS, OpenText-LiveLink, Oracle Text, Ultra Search and interMedia, Orangevalley Intranet Search Engine, orenge (empolis, Panoptic Search, PDF WebSearch, Perl Scripts, Perifect Search, Phantom, PicoSearch, PLWeb (PLS/AOL), QuestAgent, QueryServer Metasearch Engine, Recommind MindServer IR, re.se@rch suite, RetrievalWare, RiSearch, RuterSearch, SearchKey Plus (ASTAWare), Selena Sol's Keyword Search (now Extropia), SharePoint (Microsoft Tahoe), Sharewire SiteSearch, Sideran Seamark Faceted Metadata Search (formerly bpAllen Teapot), SimpleSearch, SiteFerret Lite and Pro, siteLevel (formerly intraSearch), SiteMiner, SiteSearch(now DocFather), SiteSearch Indexer OavaScript), Site Server (Microsoft), SiteSurfer, S.L.I. Search, SmartDiscovery (Inxight), Spiderline, Spy-Server, Subject Search Server (SSServer), SurfMap Search, SWISH-E, SWISH++, Tahoe (Microsoft SharePoint), TEC-IMS, t.find (Eidetica), Thunderstone Webinator, Trident (now Noviforum), TYPENGO N300 Search, UdmSearch (now mnoGoSearch), Ultra Search (Oracle), Ultraseek (Verity, previously by Infoseek, then Inktomi), Universal Knowledge Processor, Verity-Search97 & K2, Virage Audio & Video Search, Visual Net, WAIS and freeWAIS, WebCat, Web-Glimpse, Webinator (Thunderstone), WebMerger, Webrom, WebSearch Perl Script, Webserver 4D, WebSonar, WebSTAR Search (4D), WideSource, Windex Search, WizDoc, Xapian (formerly Open Muscat, OmSearch), XML Query Engine, YourAmigo, Zebra, NOW (now OpenBridge), and Zoom.

Google markets the Google Search Appliance, a self-contained search engine. When applied to this invention, this appliance can be logically placed within the same domain or organization that houses the documents. Alternatively, it can be located anywhere as long has it has network access to the document server and clients have network access to it.

Client

Web Browser Client

Browser applications that can be used in this invention include, without limitation, the following: BrowserOne (published by Digital Internet), Opera (Opera Software), Ultra Browser (UltraBrowser.com), Xeonn-Turbo (Xeonn.net), Avant Browser (Anderson Che), Smart Bro (Bassam Jarad), NJStar Asian Explorer (NJStar Software), GameNet Browser (Smartalec), Maxthon (MyIE2 Team), Omnibrowser (Omnibrowser.com), SiteKiosk (PROVISIO), Wichio Browser (Revopoint), NetCaptor (Stilesoft), Mozilla Firefox (Mozilla), Deepnet Explorer (Deepnet Technologies), Mozilla (Mozilla), Slim Browser (FlashPeak), SmartFox (Startplane Communications), SportsBrowser (4comtech), KidSplorer (Devicode Technology), Optimal Desktop (Optimal Access), Ace Explorer (Tronix Software), Arlington Kiosk Browser (Arlington Technology), Advanced Browser (Tronix Software), iRider (Wymea Bay), Image Browser (Image-browser.com), WindowSurfer (WindowSurfer Software), 550 Access Browser (550 Access), FineBrowser (SoftInform), Kopassa Browser (Kopassa), 4C Vision (euris), Internet Explorer (Microsoft), Arlington Custom Browser (Arlington Technology), Net Viewer (Accessory Software), Play the Web (Philippe Vaugouin), Wysigot (Wysigot), ServiceHolder (LastReset), CafeTimePro (Protocall Computer), Freeware Browser (4comtech), Web Services Accelerator (Virtual Innovations), iNetAdviser (Softinform), Netscape (Netscape Communications), Surfnet (Info Touch Technologies), Eminem Browser (Interscope Records), PhaseOut (PhaseOut team), Proximal Voyager (InnovSoft Consulting), WebView (ABC Enterprise Systems), Internet Research Software (WebSoft), Muse-Lite (Muse Communications), Fast Browser (FastBrowser), ActivatorDesk(R. Lee Heath), Web Padlock (Leithauser Research), LE-Multibrowser (LE-Software Sweden), BrowseMan (Specialized Search), InnerX (InnerX), Aggressive Internet Research (Frank Harrison), Cygsoft LDAP Browser (Cygsoft), and WebSpeedReader (PerMaximumSoftware).

Web Grabber Client

Also known as "offline browsers", web grabber applications that can be used in this invention include, without limitation, the following: Aaron's Web Grabber by Surfware (http://www.surfwarelabs.com/Awebvacuumg.htm), kabestin software's Web Grabber (http://www.kabestin.com/webgrabber.html), PicaLoader (http://www.vowsoft.com/), HTTTrack Website Copier (published by HTTrack), Web Shutter (published by MAB Software), Offline Explorer (MetaProducts), Offline Explorer Pro (MetaProducts), Offline Explorer Enterprise (MetaProducts), Power Siphon (Applied Kinematics), Leech (Aeria), WebZIP (Spidersoft), Web Dumper (Maxprog), WebCopier (MaximumSoft), MM3 WebAssistant (MM3Tools Muenzenberger), GetBot (GetBot), WebCloner (ProductsFoundry), SurfOffline (Bimesoft), QuadSucker/Web (SB Software), RafaBot (Spadix Software), Grab-a-Site (Blue Squirrel), Offline CHM (Direct-Soft), WebCatcher (Wizissoft), ActiveSite Compiler (INTOREL), NetGrabber (FuzzSoft), Net-Ripper (SoftByte Labs), BlackWidow (SoftByte Labs), Website Extractor (InternetSoft Corporation), SuperBot (EliteSys), PageSucker (Frederic Veynachter Software), eNotebook (GoldKingko), Baldgorilla Go-Getter (Baldgorilla Software), Backstreet Browser (Spadix Software), Offline Navigator (Asona), WebWhacker (Blue Squirrel), WebGainer (LuoSoft corn), Rip Clip (Kevlex Technologies), JOC Web Spider (JOC Software), Web Capture (E-SOFT-WARE), WebSlinky (webslinky.com), HTTP Weazel (Imate Software), SBWcc Website Capture (SB Software) and Teleport Pro (Tennyson Maxwell Information Systems).

Website Extractor Client

Website extractors are client applications that mine and extract data from the web. Web extractor applications that can be used in this invention include, without limitation, Advanced Information Extractor (AIE) by Poorva, Inc., Internet Macros by iOpus, Web Grabber by Ficstar Software, Web-Site-Downloader, WebEx Service by KnowleSys, Visual Web Task by Lencom Software, Web Data Extractor by WebExtractor System, and TextPipe by Crystal Software.

Web Content Repackager

Web content repackagers are intermediate applications that receives requests from downstream client computers, retrieves web content from a server computer in response to client computer requests, modifies, transforms or translates the retrieved content; and transmits the resulting content to the clients. Website repackagers include, without limitation, automatic web page translators such as Google Translate and AltaVista Translate.

DETAILED DESCRIPTION OF DOCUMENT SERVER WEB SITE

Document server web site TOO provides classified documents to search engine 200 and to client 300. According to this invention, the classified documents served comprise conventional classified document content with the addition or subsitution of existing classification codes by titles or definitions of the codes. FIG. 4 shows a typical classified document according to conventional practice. This document is a patent application that has been classified and been published with codes that indicate its classification. FIGS. 5 and 6 show two documents according to this invention. In FIG. 5, titles of the class codes have been added to the document. In FIG. 6, translations of titles of the class codes have been added to the document. When the classification system is hierarchical, it is preferable to add the subclass title together with the titles of its ancestors as has been done in FIGS. 5 and 6.

According to this invention, document server web site 100 can store a collection of static classified documents 110 to which code titles or definitions 111 have been added. These static documents can be prepared and stored as files in any one of several suitable file formats including, but not limited to, HTML, XML, PDF and MSWord. These can be stored on magnetic disc in the Web server itself or on a separate server or NAS device.

According to this invention, document server web site 100 preferably produces documents 110 dynamically in response to a request from a search engine spider or other web client.

Collections of Classified Documents

This invention processes classified starting documents for indexing by search engines. Preferably, these starting documents are part of collections of classified starting documents. Examples of starting document collections that can be used for this invention include, without limitation, the following patent and trademark patent collections:

Weekly Patent Bibliographic Raw Data supplied by the U.S. Patent and Trademark Office (http://www.uspto.gov/web/menu/patdata.html) including Grant Red Book V2.5 (xml) bibliographic data, Application Red Book VI .5 (XML) bibliographic data, and Patent Full-Text/APS (Green Book) bibliographic data. EPO bibliographic data and abstracts supplied by the European Patent Office (http://ebd.epoline.org/ebd/) include EBD ST.32 format data and Abstracts in ST.32 format. Publications by the Japan Patent Office include Kokai and Registered Patents on DVD and CD-ROM, Patent and Registered Utility Models on DVD and CD-ROM, English Abstracts of Kokai on CD-ROM, Design Patents on CD-ROM, Trademarks on CD-ROM, and International Trademarks on CD-ROM. Publications by the German Patent Office including Markenblatt (Trade Mark Journal) and Patentblatt (Patent Gazette). Publications of other patent offices, including without limitation, Boletines de Patentes and Boletines de Marcas published by the Argentina Patent Office; Supplement to the Australian Official Journal of Patents in PDF format, Australian Patent Abstracts, OPI Patent Specifications, and Austrailian Patents published by the Australian Patent Office; Patent and Utility Model Gazette ASCII Data by the Austrian Patent Office; Recueil des brevets d'invention by the Belgian Patent Office; Patent Documents on CD-R published by the Canadian Intellectual Property Office; Chinese Patent Specification CD-ROM, CD-ROM of Chinese Patent Abstracts, Patent Gazette CD-ROM, CD-ROM for Design, and China Patent Database published by the State Intellectual Property Office of the People's Republic of China, Ekaswa-A and Ekaswa-B CD-ROMs published by the Patent Facilitating Centre, India; Patent Abstracts of Russia; RUPAT and RUABEN published by the Russian Agency for Patent and Trademarks; BREF CD-rom published by INPI; and the PCT Electronic Gazette and the PCT Database on CD-ROM published by the World Industrial Property Office.

Classification Systems

This invention solves this problem by making definitions or schedules of classifications that have been applied to a particular document accessible to a fulltext search engine in a manner that fulltext searches for terms and phrases occurring in the classification definitions and/or titles can retrieve the document.

There are many classification systems and information coding systems that can serve in embodiments of this invention.

Several are described below but this invention is not limited to these examples.

The U.S. Patent Classification System (http://www.uspto.gov/go/classification/) is used by the United States Patent Office to classify patent applications, pregrant patent publications and granted patents. One or more classifications are assigned to each document and published in the gazette.

The World Intellectual Property Organization (WIPO) Administers Four Classification Systems (http://www.wipo.int/classifications/en/): the International Patent Classification (IPC) system for patents, the Nice Classification of goods and services for the purposes of the registration of marks, the Locarno Classification for industrial designs, and the Vienna Classification of the figurative elements of marks.

The European Patent Office maintains the European Patent Classification (ECLA) system for European patent applications and documents. (Searchable at http://I2.espacenet.com/eclasrch.)

The Japanese Patent Office (http://www.jpo.go.jp) maintains the File Index (FI) classification system (an analogue to ECLA) and the File-Forming Term (F-Term) search coding system and applies these, together with the IPC classifications to patent applications and granted patents.

Thomson Derwent maintains the Derwent Classification, the Chemia Patents Index (CPI) Manual Codes, and the Electrical Patents Index Manual Codes (EPI manual codes) system for electrical and electronic engineering patents (http://thomsonderwent.com/support/dwpiref/reftools/classificatio The North American Industry Classification System (NAICS) is jointly maintained by the governments of the United States, Canada and Mexico (http://www.census.gov/epcd/www/naics.html) as is the North American Product Classification System (http://www.census.gov/eos/www/napcs/napcs.htm). The NAICS was developed as a replacement for the U.S. Standard Classification System (SIC) which is nonetheless still in use and can be used in this invention.

The United Nations Statistics Division (http://unstats.un.org/unsdlcr/registry/) maintains a registry of Statistical Classifications that can be used in this invention. These include economic activity classifications such as the International Standard Industrial Classification of All Economic Activity (ISIC), the Central Product Classification (CPC), the Standard International Trade Clas.sification (SITC), the Classification by Broad Economic Categories (BEC), Classifications of the Functions of Government (COFOG), the Classification of Individual Consumption According to Purpose (COICOP), Classification of the Purposes of Non-Profit Institutions Serving Households (COPNI), Classification of the Outlays of Producers According to Purpose, (COPP) and the Trial International Classification of Activities for Time-Use Statistics (ICATUS).

EUROSTAT is custodian of the Statistical Classification of Economic Activities in the European Community (NACE) (http://europa.eu.int/comm/eurostat/ramon), the Statistical Classification of Products by Activity in the European Economic Community (CPA) and the Classification of Environmental Protection Activities and Expenditure (CEPA).

AFRISTAT (http://www.afristat.org) is the custodian of the Activity Classification of AFRISTAT Member States (NAEMA), the Product Classification of AFRISTAT Member States (NOPEMA).

The Australian Bureau of Statistics (http://www.abs.gov.au/AUSSTATS) is custodian of the Australian and New Zealand Standard Classification (ANZSIC).

The World Customs Organization (http://www.wcoomd.org/ie/index.html) is custodian of the Harmonized Commodity Description and Coding System (HS).

A The International Labor Organization is custodian of the International Standard Classification of Occupations (ISCO), the International Classification of Status in Employment (ICSE), International Standard Industrial Classification of all Economic Activities (ISIC), International Standard Classification of Education (a UNESCO classification) (ISCED) and classifications of occupational injuries.

The World Health Organization (www.who.int) is custodian of the International Statistical Classification of Diseases and Related Health Problems (ICD-10); the International Classification of Impairments, Disabilities, and Handicaps (ICIDH); and the International Classification of Functioning, Disability and Health (ICF).

The Library of Congress maintains the Library of Congress Classification (http://www.loc.gov/catdir/cpso/lcco/lcco.html). The Dewey Decimal Classification (DDC) system is owned by OCLC (http://www.oclc.org/dewey/about/).

Several technical associations and publishers of scholarly and technical journals and periodicals maintain classification systems that can be used in this invention. The American Economic Association maintains the Journal of Economic Literature classification system. The Institute of Acoustics maintains the BEPAC Acoustics Library Classification system (http://www.ioa.org).

The Government Printing Office maintains the Superintendent of Documents classification system (hftp://www.access, gpo.gov/su_docs/fd Ip/pubs/classman/index, hu Classification systems maintained by online database providers can; be used in this invention. Examples include, without limitation, ABI/INFORM (http://support.dialog.com/searchaids/dialog/fl 5_f635_ccodes.shtr BIOSIS® Previews Biosystematic Codes and the Organism Classifier TI Conversions (http://support.dialog.com/searchaids/dialog/f5_code<CABICODES in CAP Abstracts (http://support.dialog.com/searchaids/dialog/f50_cabicodes_list.sh CAS Registry Numbers, CAL classification codes (http://support.dialog.com/searchaids/dialog/f8_ccodes.shtml), Me! descriptors and tree structures (http://www.nlm.nih.gov/mesh/introduction2004.html), the ACM Computing Classification system (http://www.acm.org/class/1998/) the lnspec(r) Classification system (http://www.iee.Org/publish/support/inspec/document/electronic.c Classification System Database In order to automatically produce a collection of static documents or to dynamically produce merged documents as part of the Document Server Web Application, the classification information to be used for these operations is stored in a database. There are several commercially available software packages that can be used, including but not limited to Watcom SQL, Oracle, Sybase, Access, Microsoft SQL Server, IBM's DB2, AT&T's Daytona, NCR's TeraData and DataCache.

At its simplest, this database comprises a table with two columns: a normalized code column and a class title column. The normalized code column comprises a unique code that is a retrieval key for locating the class title as shown in FIG. 7. Preferably, this table also includes the columns shown in tblUSPCSchedule in FIG. 8a, in other words, an indentity column 'classid', a level column 'level' which contains the hierarchy or indent level of the class, and a CDISP column which contains a string in a format commonly used in public records for that class. (FIG. 8a shows the first few rows of a schedule table for the U.S. Patent Classification System.) It is important that the table be sortable on the classid column so as to reproduce the ordering of the U.S. Patent Classification Schedule at least for subclasses within single classes.

Preferably, the database also contains a table contain the direct hierarchical lineage of each class under the top level such as shown in tblUSPCHierarchy in FIG. 8b. In this abbreviated table for the U.S. Patent Classification System, the classid and ancestorid column entries reference the classid column in tblUSPCSchedule.

Preparation of Classification System Database

The classification system database can be prepared from an electronic copy of the classification system or by Internet download when available on the Internet. Several programming approaches are available to those knowledgeable in the field and source code is included in the embodiments below.

Document Server Document Store

The document store holds the documents that are to be provided to search engines and to web clients. While the store can comprise static documents in a file system, it preferablly comprises a base collection of documents in a file system or database that are dynamically merged with classification data when fed to search engines and web clients.

A static document collection according to this invention comprises documents that contain content from the starting document collection together with classification information from the classification system's schedule and/or definitions. The static documents are preferably in HTML format, but may also be in any format that can be processed by search engines such as pdf, hdml, xml, cfm, doc, xls, ppt, rtf, wks, lwp, wri, or swf.

The information from the classification system's schedule and/or definitions may be whole class or subclass titles, whole class or subclass definitions, or portions of either, for example, selected keywords extracted from titles and/or definitions.

The information from the classification system's schedule and/or definitions may be in the same language as the containing document. It can also be in a second language. For example, an English patent record derived from a USPTO starting document collection may be merged with a Japanese translation of the applied class code titles. This provides a mechanism by which the documents can be searched in the second language.

If the classification system is hierarchical, it is preferable to insert the titles and/or definitions of the hierarchically directly superior classifications of a starting document's classifications into the containing document.

Preparation of Document Server Document Store

While a static document store according to this invention can be prepared by manually merging classification titles and/or definitions into a classified document, it is preferable to automate this process. Examples of manually prepared documents are shown in FIGS. 5 and 6.

The automatic preparation of a static document store according to this invention is preferably an extension of a preparation of a dynamic document store according to this invention so the preparation of a dynamic document store is described first.

Document Server Web Application

According to this invention, documents from the document store are made available to search engines and web clients by means of a server web application which communicates documents from the document store to a search engine client or web client in response to a request by the client. This communication is preferably performed according to the HTTP protocol, but can also be according to other protocols, including without limitation, File Transfer Protocol (FTP), Simple Mail Transport Protocol (SMTP) and Network News Transfer Protocol (NNTP).

Server web applications that can be used for this invention include, without limitation, Apache specific servers such as AbaSioux, Apache, Apache-(PZ)-! .3.31, Apache-1.3.27, Apache-ADTI, Apache-AdvancedExtranetServer, Apache-Coyote, Apache-NeoNova, Apache-NeoWebScript, Apache-SSL, Apache1.3.29, DataClub-Apache, FJapache, Gonzolix-Apache, HP-UX_Apache-based_Web_Server, Rapidsite, Red, ServerApache, Stronghold, and SudApache; Microsoft NT specific servers such as Commerce-Builder, Microsoft-US, Microsoft-Internet-Information-Server, Purveyor, Web-Site, and WebSitePro; Roxen specific servers such as Roxen, Roxen Challenger, Roxen Webserver, and Spinner; and Macintosh specific servers such as 4D_WebSTAR_S, 4D_WebStar_D, AppleLISA, AppleShareIP, AppleWSE, CL-HTTP, HomeDoor, Interaction, MACOS.PersonaLWebsharing, MacHTTP, NetPresenz, QuidProQuo, WebSTAR, WebSTAR4, WebStar, WebStarV, and Web_Server_4D.

While this invention can be practiced by serving static HTML documents from a simple web application, it is preferably practiced with a web application that is capable of serving dynamic documents. Dynamic documents (or "server pages") comprise dynamic content. Dynamic content is, for example, in the case of the World Wide Web, web page content that includes the usual static content such as display text and markup tags, and, in addition, executable program content. Executable program content includes, for example, Java, VBScript, CGI gateway scripting, PHP script, and Perl code. The kind of executable program content found in any particular dynamic server page depends on the kind of dynamic server page engine that is intended to render the executable program content. For example, Java is typically used in Java Server Pages ("JSPs") for Java Server Page engines (sometime referred to in this disclosure as "JSP engines"); VBScript is used in Active Server Pages ("ASPs") for Microsoft Active Server Page engines (sometime referred to in this disclosure as "ASP engines"); Visual Basic and C# are used in Microsoft ASP.NET server web applications, and PHP script, a language based on C, C++, Perl, and Java, is used in PHP pages for PHP: Hypertext Preprocessor engines.

DOCUMENTS PRODUCED BY SERVER WEB Application

The documents produced by the server web application and transmitted to search engines and/or clients can be in any of several file formats that can be transmitted over a network and read by search engines and web clients. These formats include, without limitation, HTML, XML, MSWord, MSExcel, RTF and PDF.

Those skilled in the art will appreciate that many modifications can be made to the above system and methods without departing from the scope of the present invention.

PREFERRED EMBODIMENT

Appendix 1 presents source code and other documentation, on CD-ROM, that has been written in the course of development of a prototype developed according to the embodiments.

This embodiment discloses the merging of a classified patent record and subclass titles into a dynamic XML document that is inserted into a website that is made accessible to a web spider or crawler so that it can be indexed by a web search engine.

Jj^$_e$ hardware environment is a Dell PowerEdge 1650 server equipped with two Model 80530 Intel 1.4 GHz processors, 1 GB of physical memory and 136 GB of hard disk in a RAID 10 configuration. The operating systems is Microsoft Windows 2000 Server containing Microsoft Internet Information Services (IIS) Version 5. A website is created according to IIS documentation and configured to allow anonymous access. The server is connected through a LAN network to a CISCO 2621XM router which is connected to the Internet. In addition, Microsoft SQL Server Version 7.0 is installed and the Microsoft NET Framework is installed on the website.

Data Store for Classification Data. A database is created according to the SQL Server 7.0 documentation. Two tables, USPCSchedule and USPCHierarchy, are created in this database using the SQL script disclosed in the supplemental file USPCScheduleAndHierarchyTables.sql.

The U.S. Patent Classification schedule is downloaded into the two tables using a COM component executed from an Microsoft Excel spreadsheet using a Visual Basic macro. Source code for the macro (in Visual Basic), an SQL stored procedure (in Transact-SQL) used to insert schedule data into table USPCSchedule, and for the COM component (in C++) is listed in the supplemental file PCDownloadCode.txt.

Figure 9:
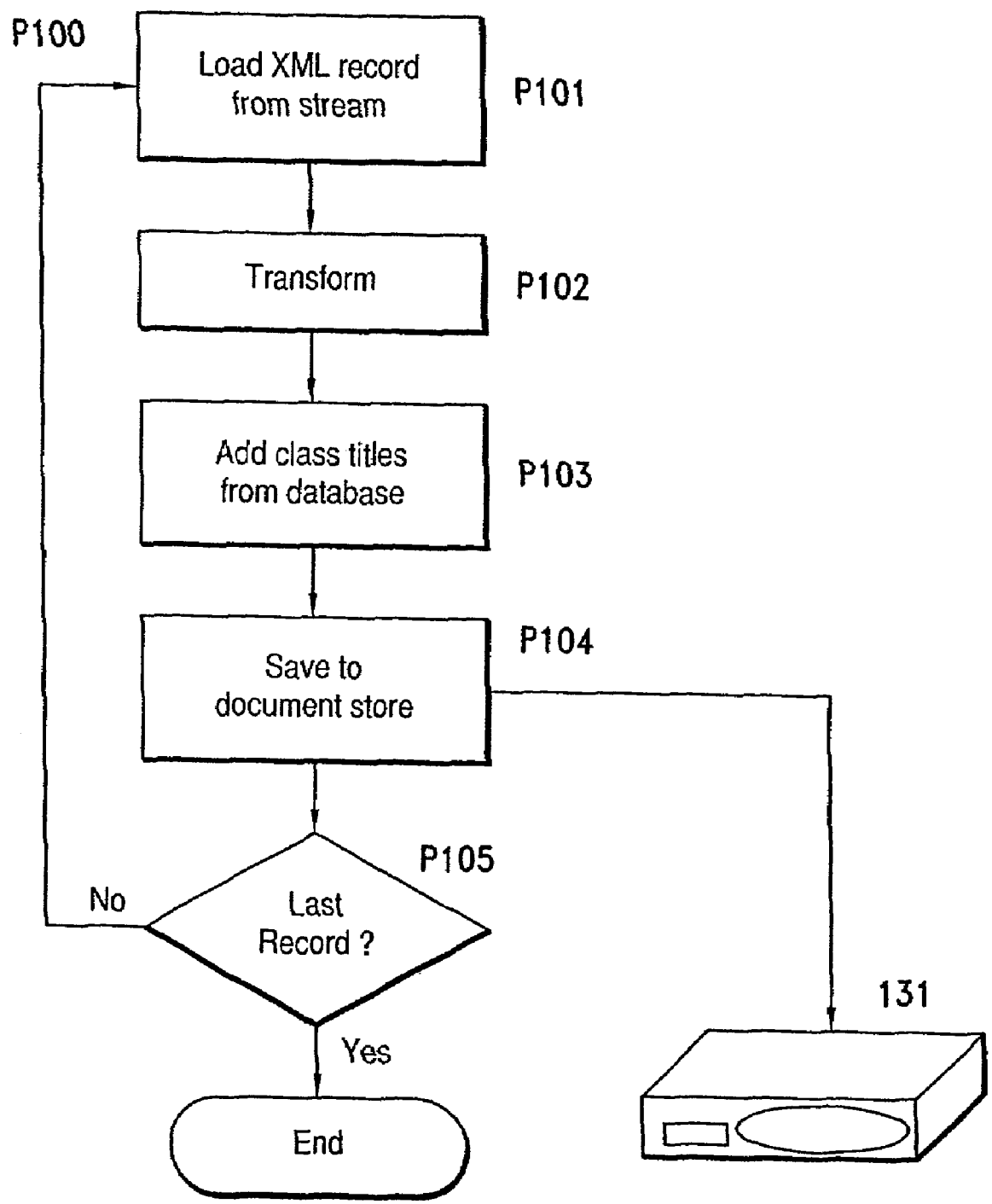

The Document Store is produced from the Weekly Patent Bibliographic Raw Data downloaded from the U.S. Patent and Trademark Office (http://www.uspto.gov/web/menu/patdata.html) in Grant Red Book V2.5 (xml) format. The process is shown in FIG. 9. Except where noted below, this application is developed in Microsoft Visual Studio NET 2003 as an ATL executable. A stream is opened from the downloaded and unzipped raw data file. An XML record is read from the stream (Step P101). This record is transformed using an XSL stylesheet (Step P102). In Step P103, the class titles corresponding to the U.S. Classification codes listed in the record are inserted into the record. The resulting record is saved to document store 131 in Step P104.

Step 101 is necessary because the raw data file is a concatentated stream of XML records, but itself is not XML-compliant. (There is no document element enclosing the entire content.) XML records are read one-by-one by performing a string search (wcsstr) for the string "<?xml" that starts the subsequent XML record and copying the found record into a buffer.

In Step 102, the record in the buffer is loaded into an XML DOM object and transformed using the XSL stylesheet listed in the attached computer program listing Step P102.txt. This transformation produces two elements 'usco' and 'uscx' that contains an attribute 'pccode'. The value of this attribute is a retrieval key for the subclass that is in the same format as corresponding column 'pccode' in the tblUSPCSchedule created above. The resulting XML document is saved to NAS 131 with the DOM's save method (P104) with the following C++ code.

$hr=m\_spDOM\text{->}save(\_variant\_t(path));$

The path in the above code is computed from the document id number using the following code

```
CComBSTR bstrdocid;bstrdocid.Empty( );
hr = get_docid( Abstrdocid )
wstring docid((wchar_t*)bstrdocid);
wchar_t path[MAX_PATH];
memset(path, '\0', sizeof(path));
wsprintf( path, L"%s\\%s\\%sOOOO\\%sOO\\%
```

-continued

```
s.xml","/*root*/ websiteroot , docid.substr(0,4).c_str( ),
docid.substr(0,7).c_str( ),docid.substr(0,9).c_str
0,docid.c_strO);
``` where 'websiteroot' is the path to the root directory of the document store and 'get_docid' is a method that reads the value of the element <pdoc/sdbi/iden/nmbr/> in the XML document produced in Step P102.

Web Site Application and Indexing by Search Engine. Seven files are prepared and placed in the root directory: FolderBrowse.aspx, FolderBrowse.aspx.es, FolderBrowse.aspx.resx, ShowAbstract.aspx, ShowAbstract.aspx.es, ShowAbstract.aspx.resx and Global.asax.

FolderBrowse.aspx together with FolderBrowse.aspx.es and FolderBrowse.aspx.resx (attached as FolderBrowse.aspx.txt FolderBrowse.aspx.cs.txt and FolderBrowse.aspx.resx.txt, respectively) present the contents of the document store to clients and search engines in a browsable structure.

Figure 10:
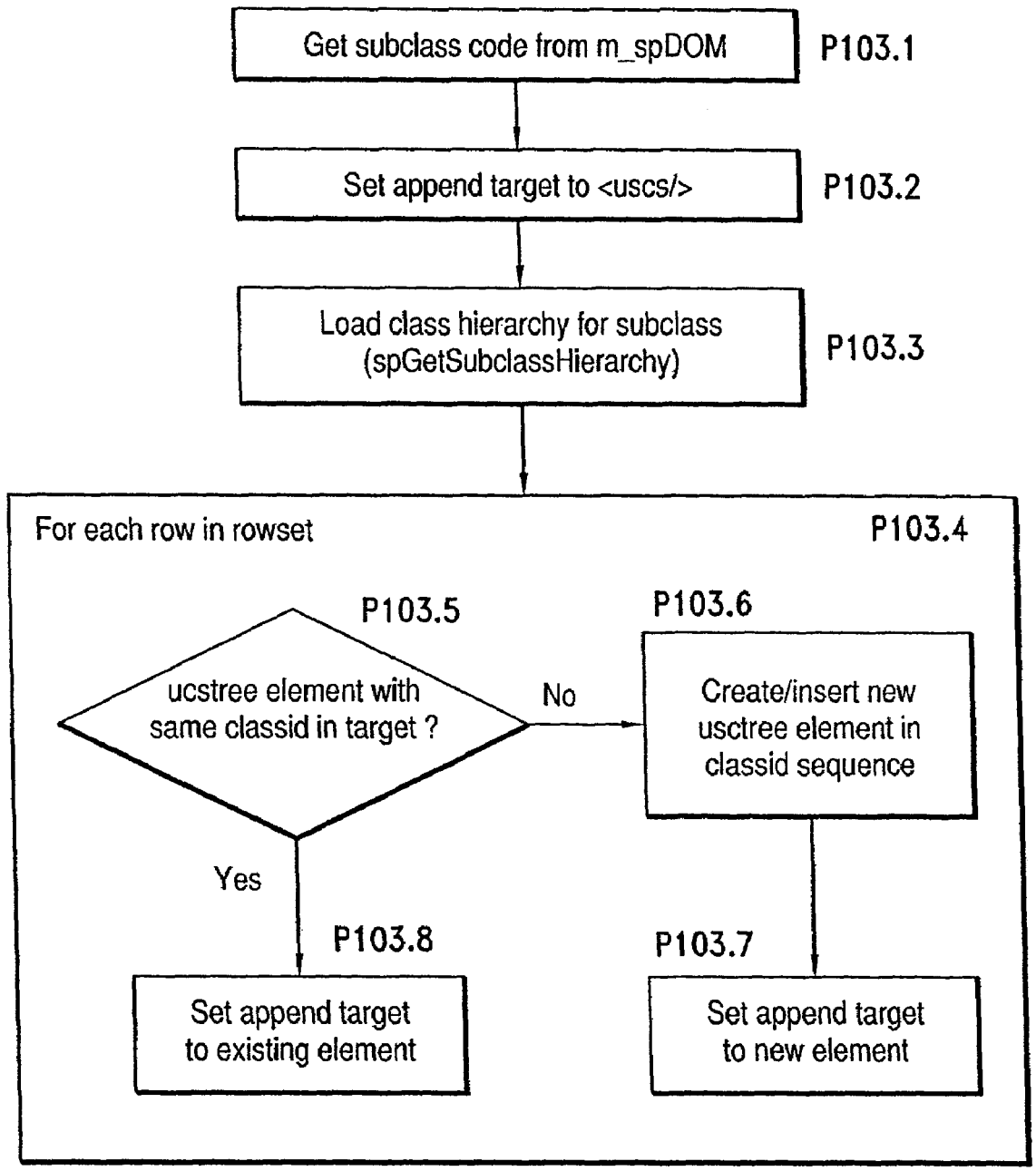
FIG. 10 Process for inserting classification information into document

ShowAbstract.aspx, ShowAbstract.aspx.es, and ShowAbstract.aspx.resx (attached as ShowAbstract.aspx.txt, ShowAbstract.aspx.cs.txt, and ShowAbstract.aspx.resx.txt, respectively) retrieve XML records from the document store, inserts classification titles from the database, converts the result to HTML, and returns the resulting HTML to the client. The subclass titles corresponding to the pccode attributes are retrieved from the database and used to create an element tree 'usctree' as a child of the element uses that contains the U.S. Classification information. This routine operates on the XML document m_spDOM. Source code for this step is listed in the attached computer program listing Step P103.txt. This step access the database using the SQL stored procedure spGetSubclassHierarchy listed in the attached computer program listing StepP103sql.txt. The steps shown in FIG. 10 are performed for each classification. The subclass retrieval key pccode is retrieved from m_spDOM and the root element to which usctree is to be appended is initialized at <uscs/> (P103.1 and P103.2). For each row retrieved from spGetSubclassHierarchy (P103.3), the current append target is checked for an usctree element with the same classid attribute (P103.5). If such element has already been appended, the append target is set to that element (P103.8) and the next row processed. If such element has not yet been added, a new usctree element is created and appended so as to preserve the order of classids in the append target (P103.6) and the append target set to the new element (P103.7). The resulting XML document is converted to HTML with the attached XML stylesheet cxptohtml.xsl.txt.

Global.asax (attached as Global.asax.txt) contains a routine to convert "search engine friendly" links, i.e., URLs that do not have a '?' character, into URLs with query strings that are compatible with FolderBrowse.aspx and ShowAbstract.aspx. So that URLs with an html extension will general calls to the Application_BeginRequest function in global.asax, the configuration of thw web application is set to map such URLs to aspnet_isapi.dll.

The attached XML stylesheet cxptohtml.xsl.txt is placed (without the txt extension) in the root directory of the web site and the URL of the root directory of the website is submitted to the Google search engine (http://www.google.com/addurl.html).

Retrieval by Google search. After the documents have been indexed by Google, a process that may take several weeks, terms from the U.S. Classification system are entered into the Google search form at www.google.com and the search submitted.

EMBODIMENT 1

This embodiment discloses a search engine-indexable website containing a static document consisting of a classified U.S. patent record which contains a subclass title.

The hardware environment is a Dell PowerEdge 1650 server equipped with two Model 80530 Intel 1.4 GHz processors, 1 GB of physical memory and 136 GB of hard disk in a RAID 10 configuration. The operating systems is Microsoft Windows 2000 Server containing Microsoft Internet Information Services (IIS) Version 5. A website is created according to IIS documentation and configured to allow anonymous access and browsing. The server is connected through a LAN network to a CISCO 2621XM router which is connected to the Internet.

Using Microsoft Internet Explorer Version 6.0, the record for a U.S. Patent Application is accessed from the United States Patent Office Website. The source of this record is viewed and the bibliography portions, including the U.S. Current Classification field are copied to the body of an HTML document that has been prepared using Microsoft Notepad. The title of the subclass specified in the current classification field is located from the USPTO's Patent Classification Home Page (http://www.uspto.gov/go/classification) and copied into a table row that has been prepared below the Current Classification field of the HTML document. A document resulting from this manipulation is contained as file 200401 7701 5. htm.txt on the supplemental compact disc. This document is saved into the root directory website. The URL of the root directory of the website is submitted to the Google search engine (http://www.google.com/addurl.html).

EMBODIMENT 2

This embodiment discloses a search engine-indexable website containing a static document consisting of a classified U.S. patent record which contains a subclass title and the titles of its ancestor subclasses.

The hardware and software environment of Embodiment 1 is used. Using Microsoft Internet Explorer Version 6.0, the record for a U.S. Patent Application is accessed from the United States Patent Office Website. The source of this record is viewed and the bibliography portions, including the U.S. Current Classification field are copied to the body of an HTML document that has been prepared using Microsoft Notepad. The title of the subclass specified in the current classification field is located from the USPTO's Patent Classification Home Page (http://www.uspto.gov/go/classification) and copied, together with its ancestor subclass and class titles, into a table row that has been prepared below the Current Classification field of the HTML document. A document resulting from this manipulation is contained as file 20040167928.htm.txt on the supplemental compact disc. This document is saved into the root directory website. The URL of the root directory of the website is submitted to the Google search engine (http://www.google.com/addurl.html).

EMBODIMENT 3

This embodiment discloses a search engine-indexable website containing a static document consisting of a classified U.S. patent record which contains, in a second language, a subclass title and the titles of its ancestor subclasses.

The hardware and software environment of Embodiment 1 is used. Using Microsoft Internet Explorer Version 6.0, the record for a U.S. Patent Application is accessed from the United States Patent Office Website. The source of this record is viewed and the bibliography portions, including the U.S. Current Classification field are copied to the body of an HTML document that has been prepared using Microsoft WordPad (Japanese Version). The title of the subclass specified in the current classification field is located from the USPTO's Patent Classification Home Page (http://www.uspto.gov/go/classification), translated into Japanese, and inserted, together with its ancestor subclass and class titles, into a table row that has been prepared below the Current Classification field of the HTML document. This document is saved into the root directory website. The URL of the root directory of the website is submitted to the Google search engine (http://www.google.com/addurl.html).

EMBODIMENT 4

This embodiment discloses the merging of a classified patent record and subclass titles into a static XML document that is inserted into a website that is made accessible to a web spider or crawler so that it can be indexed by a web search engine.

The hardware and software environment of Embodiment 1 is used. In addition, Microsoft SQL Server Version 7.0 is installed and the Microsoft NET Framework is installed on the website.

Data Store for Classification Data. A database is created according to the SQL Server 7.0 documentation. Two tables, USPCSchedule and USPCHierarchy, are created in this database using the SQL script disclosed in the supplemental file USPCScheduleAndHierarchyTables.sql.

The U.S. Patent Classification schedule is downloaded into the two tables using a COM component executed from an Microsoft Excel spreadsheet using a Visual Basic macro. Source code for the macro (in Visual Basic), an SQL stored procedure (in Transact-SQL) used to insert schedule data into table USPCSchedule, and for the COM component (in C++) is listed in the supplemental file PCDownloadCode.txt.

The Document Store is produced from the Weekly Patent Bibliographic Raw Data downloaded from the U.S. Patent and Trademark Office (http://www.uspto.gov/web/menu/patdata.html) in Grant Red Book V2.5 (xml) format. The process is shown in FIG. 9. Except where noted below, this application is developed in Microsoft Visual Studio NET 2003 as an ATL executable. A stream is opened from the downloaded and unzipped raw data file. An XML record is read from the stream (Step P101). This record is transformed using an XSL stylesheet (Step P102). In Step P103, the class titles corresponding to the U.S. Classification codes listed in the record are inserted into the record. The resulting record is saved to document store 131 in Step P104.

Step 101 is necessary because the raw data file is a concatentated stream of XML records, but itself is not XML-compliant. (There is no document element enclosing the entire content.) XML records are read one-by-one by performing a string search (wcsstr) for the string "<?xml" that starts the subsequent XML record and copying the found record into a buffer.

In Step 102, the record in the buffer is loaded into an XML DOM object and transformed using the XSL stylesheet listed in the attached computer program listing StepP102.txt. This transformation produces two elements 'usco' and 'uscx[1] that contains an attribute 'pccode'. The value of this attribute is a retrieval key for the subclass that is in the same format as corresponding column 'pccode' in the tblUSPCSchedule created above. Note that this stylesheet produces an xml-stylesheet in the output.

In Step 103, the subclass titles corresponding to the pccode attributes are retrieved from the database and used to create an element tree 'usctree' as a child of the element uses that contains the U.S. Classification information. Source code for this step is listed in the attached computer program listing StepP103.txt. This routine operates on the XML DOM object (m_spDOM) that was prepared in Step 102. This step access the database using the SQL stored procedure spGetSubclassHierarchy listed in the attached computer program listing StepP103sql.txt. The steps shown in FIG. 10 are performed for each classification. The subclass retrieval key pccode is retrieved from m_spDOM and the root element to which usctree is to be appended is initialized at <uscs/> (P103.1 and P103.2). For each row retrieved from spGetSubclassHierarchy (P103.3), the current append target is checked for an usctree element with the same classid attribute (P103.5). If such element has already been appended, the append target is set to that element (P103.8) and the next row processed. If such element has not yet been added, a new usctree element is created and appended so as to preserve the order of classids in the append target (P103.6) and the append target set to the new element (P103.7). The resulting XML document is saved to MAS 131 with the DOM's save method (P104) with the following C++ code.

$hr = m\_spDOM\text{-}>save(\_variant\_t(path));$ j^g$_{path\ in\ the}$ above$_{code}$ j$_s$ computed from the document id number using the following code

```
CComBSTR bstrdocid;bstrdocid.Empty( );
hr = get_docid( &bstrdocid );
wstring docid((wchar_t*)bstrdocid);
wchar_t path[MAX_PATH];
memset(path, '\0', sizeof(path) );
wsprintf( path, L"%s\\%s\\%sOOOO\\%sOO\\%
s.xmr,/*root*/ websiteroot, docid.substr(0,4).c_str( ),
docid.substr(0,7).c_str( ),docid.substr(0,9).c_str
( ),docid.c_str( ));
``` where 'websiteroot' is the path to the root directory of the web site and 'geLdocid' is a method that reads the value of the element <pdoc/sdbi/iden/nmbr/> in the XML document produced in Step P103.

Web Site Application and Indexing by Search Engine. The attached XML style sheet cxptohtml.xsl is placed in the root directory of the web site and the URL of the root directory of the website is submitted to the Google search engine (http://www.google.com/addurl.html).

Retrieval by Google search. After the documents have been indexed by Google, a process that may take several weeks, terms from the U.S. Classification system are entered into the Google search form at www.google.com and the search submitted.

EMBODIMENT 5

This embodiment discloses the merging of a classified U.S. patent record and subclass titles into a static HTML document that contains embedded object links to the class definition and is inserted into an indexed website.

Figure 11:
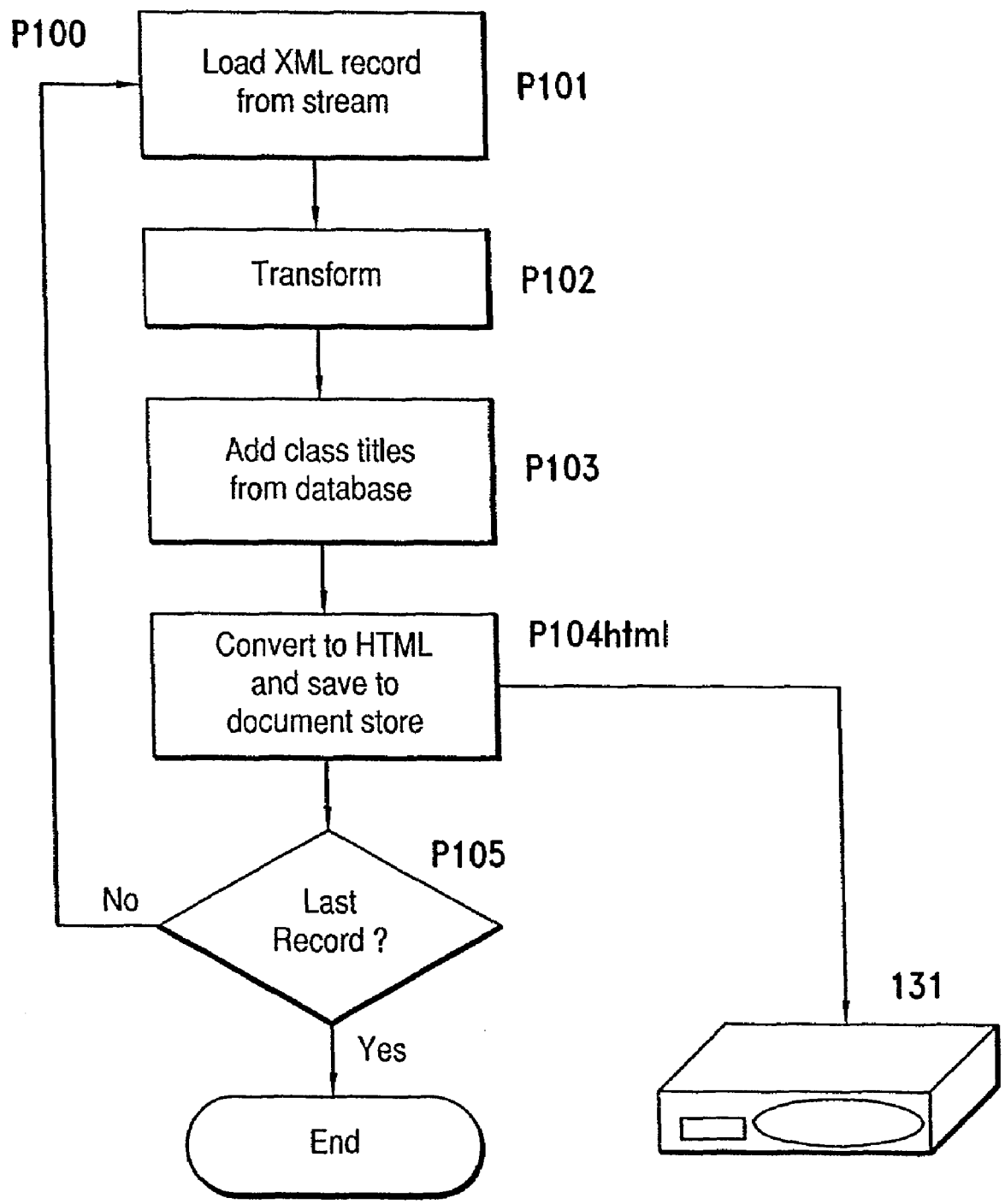
FIG. 11 Process for producing document store according to Embodiment 5
Figure 12:
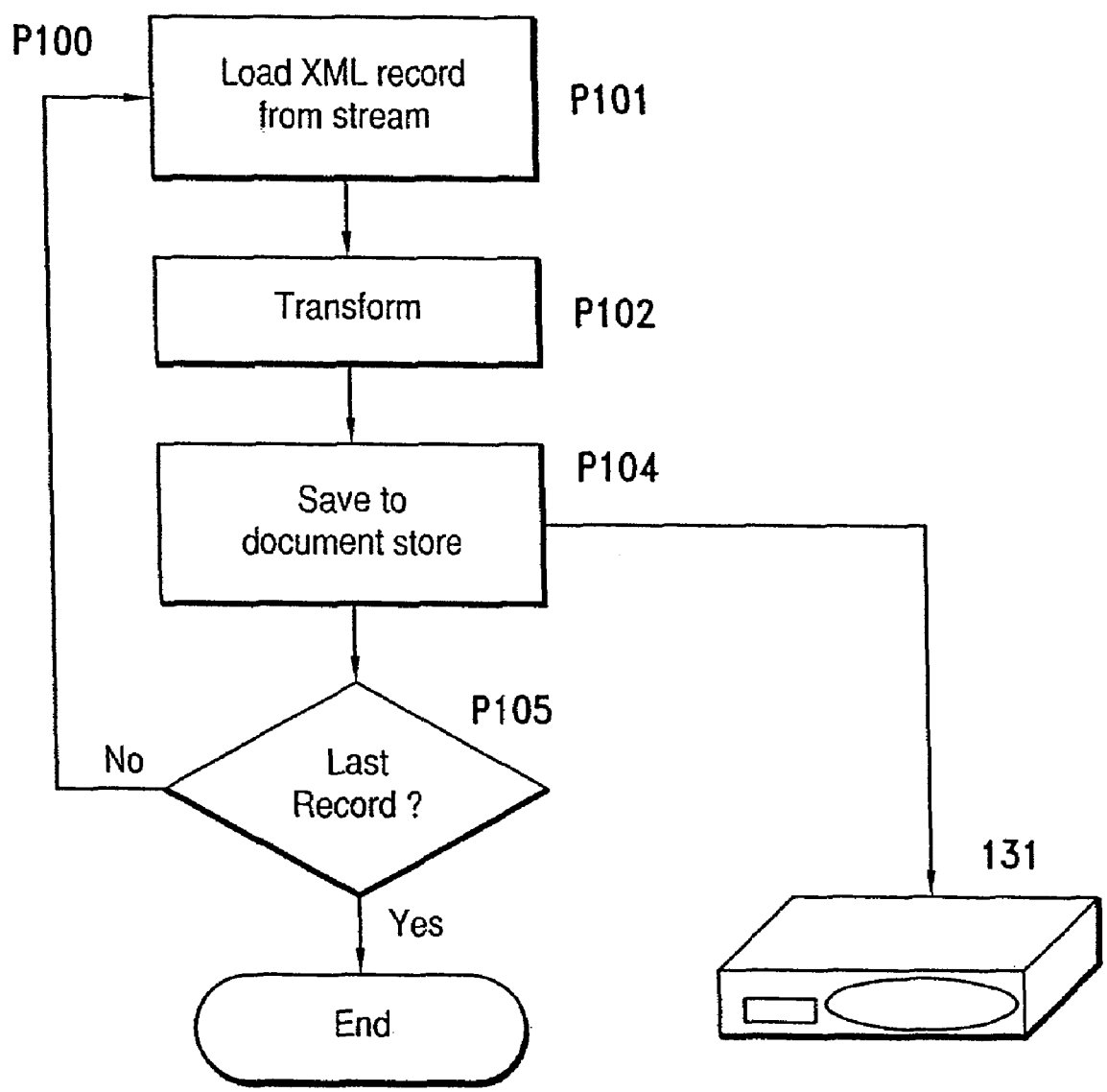
FIG. 12 Process for producing document store according to the Preferred Embodiment

Embodiment 4 is followed with the following exceptions:

*step P1 Q4 is replaced with step P1 Q4html* as shown in FIG. 11. In Step P104html, the XML document that is produced by Step 103 is transformed to HTML using the XML stylesheet cxptohtml.xsl.txt (attached) before saving to the document store. The source code fragment (with error handling code omitted) is attached in file Step104html.txt. The resulting HTML document is saved to MAS 131. The path is computed from the document id number using the following code

```
CComBSTR bstrdocid;bstrdocid.Empty( );
hr = get_docid( Abstrdocid );
wstring docid((wchar_t*)bstrdocid);
wchar_t path[MAX_PATH];
munset(path, '\0', sizeof(path));
wsprintf( path, L"%s\\%s\\%sOOOO\\%sOO\\%
s.htm",/*root*/ websiteroot, docid.substr(0,4).c_str( ),
docid.substr(0,7).c_str( ),docid.substr(0,9).c_str
( ),docid.c_str( ));
``` where 'websiteroot' is the path to the root directory of the web site and 'get_docid' is a method that reads the value of the element <pdoc/sdbi/iden/nmbr/> in the XML document produced in Step P103.

XML stylesheet cxptohtml.xsl is omitted from the root directory of the web site.

INDUSTRIAL APPLICABILITY

This invention is applicable to the facile indexing and retrieval of classified documents over a network.

The invention claimed is:

1. A document system comprising:
a web server computer adapted to receive a document collection in a first format, the document collection including a plurality of documents in the first format, each document including an indication of a corresponding classification code;
a database server computer coupled to the web server computer and including a document store adapted to store the documents; and
wherein the web server computer is adapted to transform each document by substituting the classification code corresponding to that document with a keyword associated with the corresponding classification code,
wherein the web server computer is adapted to convert each document, including its keyword, from the first format into a second format different from the first format,
wherein the web server computer is adapted to transmit each converted document to the database server computer and the database server computer is adapted to store the converted document in the document store, and
wherein the web server computer is adapted to provide converted documents corresponding to a request received from another system, different from the document system.

2. The document system of claim 1, wherein the first format is extensible mark-up language (XML).

3. The document system of claim 1, wherein the second format is a display format.

4. The document system of claim 3, wherein the display format is hypertext mark-up language (HTML).

5. The document system of claim 1, wherein each keyword is based on a title of the corresponding classification code.

6. The document system of claim 1, wherein each keyword is based on a definition of the corresponding classification code.

7. The document system of claim 1, wherein each document is in a first language and each keyword is in a second language different from the first language.

8. The document system of claim 1, wherein the request received from the other system is received via a computer network and the converted documents are provided via the computer network.

9. The document system of claim 1, wherein the classification code remains in the converted document.

* * * * *